(12) United States Patent
Nadler et al.

(10) Patent No.: US 7,000,238 B2
(45) Date of Patent: Feb. 14, 2006

(54) DEVELOPMENT SYSTEM PROVIDING EXTENSIBLE REMOTING ARCHITECTURE

(75) Inventors: Richard L. Nadler, Santa Cruz, CA (US); Charles P. Jazdzewski, Soquel, CA (US)

(73) Assignee: Borland Software Corporation, Scotts Valley, CA (US)

( * ) Notice: Subject to any disclaimer, the term of this patent is extended or adjusted under 35 U.S.C. 154(b) by 704 days.

(21) Appl. No.: 10/066,090

(22) Filed: Jan. 30, 2002

(65) Prior Publication Data

US 2003/0070006 A1     Apr. 10, 2003

Related U.S. Application Data

(60) Provisional application No. 60/328,437, filed on Oct. 10, 2001, provisional application No. 60/343,507, filed on Dec. 21, 2001.

(51) Int. Cl.
    *G06F 9/44*        (2006.01)

(52) U.S. Cl. ....................................... 719/330; 709/217

(58) Field of Classification Search ................. 719/328, 719/330; 709/203, 230, 217
    See application file for complete search history.

(56) References Cited

U.S. PATENT DOCUMENTS

| | | | |
|---|---|---|---|
| 5,280,610 A | | 1/1994 | Travis et al. ................. 707/103 |
| 5,724,588 A | * | 3/1998 | Hill et al. .................... 719/328 |
| 5,754,774 A | * | 5/1998 | Bittinger et al. ............ 709/203 |
| 5,778,228 A | * | 7/1998 | Wei ............................. 719/328 |
| 5,793,965 A | | 8/1998 | Vanderbilt et al. .......... 709/203 |
| 5,974,416 A | | 10/1999 | Anand et al. .................. 707/10 |
| 6,108,715 A | | 8/2000 | Leach et al. ................. 709/330 |
| 6,125,400 A | | 9/2000 | Cohen et al. ................ 709/247 |
| 6,134,603 A | | 10/2000 | Jones et al. .................. 709/330 |
| 6,151,639 A | | 11/2000 | Tucker et al. ................ 709/316 |

(Continued)

OTHER PUBLICATIONS

Waldo "remote procedure calls and Java remote method invocation" 1998 IEEE, pp. 5-7.*

(Continued)

*Primary Examiner*—Meng-Al T. An
*Assistant Examiner*—Van Hoa Nguyen
(74) *Attorney, Agent, or Firm*—John A. Smart; G. Mack Riddle

(57) ABSTRACT

A system providing improved methods for remote method invocation of a service is described. The system includes methodology for a client to cast, at design time, a generic interface class to a remote service having a defined interface. The generic interface class dynamically generates a proxy for making a remote method call on the remote service at runtime, while also providing for runtime type checking. The generic interface class is subclassed to provide support for particular wire formats and methods of transport. The dynamically generated proxy converts a remote method call by the client into a wire format specified in the remote service's interface definition and calls the remote service using the method of transport specified in the interface definition. The system also supports making a service available to remote clients and includes modules for converting remote method calls on a service into native format.

50 Claims, 9 Drawing Sheets

U.S. PATENT DOCUMENTS

| | | |
|---|---|---|
| 6,230,160 B1 | 5/2001 | Chan et al. .................. 707/103 |
| 6,282,581 B1 | 8/2001 | Moore et al. ............... 709/316 |
| 6,457,066 B1 | 9/2002 | Mein et al. .................. 709/330 |
| 6,487,607 B1 * | 11/2002 | Wollrath et al. ............ 719/330 |
| 6,539,437 B1 | 3/2003 | Windheim et al. .......... 709/330 |
| 6,594,483 B1 | 7/2003 | Nykanen et al. ............. 455/411 |
| 6,615,213 B1 | 9/2003 | Johnson ....................... 707/10 |
| 6,629,128 B1 | 9/2003 | Glass ......................... 709/203 |
| 6,629,154 B1 | 9/2003 | Jones et al. .................. 709/330 |
| 6,654,793 B1 | 11/2003 | Wollrath et al. ............. 709/330 |
| 6,813,641 B1 * | 11/2004 | Fomenko et al. ........... 709/230 |
| 2002/0116454 A1 * | 8/2002 | Dyla et al. .................. 709/203 |

OTHER PUBLICATIONS

O'Copnnell et al. "using SOAP to clean up configuration management" 2001 IEEE, pp. 555-560.*

* cited by examiner

DEVELOPMENT SYSTEM PROVIDING EXTENSIBLE REMOTING ARCHITECTURE

RELATED APPLICATIONS

The present application is related to and claims the benefit of priority of the following commonly-owned provisional application(s): application Ser. No. 60/328,437, filed Oct. 10, 2001, entitled "Development System Providing Extensible Remoting Architecture", of which the present application is a non-provisional application thereof; and application Ser. No. 60/343,507, filed Dec. 21, 2001, entitled "Development System Providing Extensible Remoting Architecture", of which the present application is a non-provisional application thereof. The disclosures of each of the foregoing applications are hereby incorporated by reference in their entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to distributed data processing environments and, more particularly, to development environments and methodologies providing improved support for "remoting" technologies, such as RPC, CORBA, DCOM, SOAP, and the like.

2. Description of the Background Art

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks. While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is an intermediate module or "object module," which includes instructions for execution by a target processor. In the context of Borland's Turbo Pascal and Object Pascal, the intermediate module is a Pascal "unit" (e.g., a .TPU file). Although an object module includes code for instructing the operation of a computer, the object module itself is not usually in a form that may be directly executed by a computer. Instead, it must undergo a "linking" operation before the final executable program is created.

Linking may be thought of as the general process of combining or linking together one or more compiled object modules or units to create an executable program. This task usually falls to a program called a "linker." In typical operation, a linker receives, either from the user or from an integrated compiler, a list of modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) that, after testing and quality assurance, is passed to the user with appropriate installation and usage instructions.

"Visual" development environments, such as Borland's Delphi™, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, a compiler, and a linker. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

Notwithstanding the improved productivity afforded by visual rapid application development environments, classic "desktop" applications are relatively costly to deploy. This is due partly to the issues of installing and configuring the application, and partly to the issues of communicating between the client and the server. Accordingly, there has been ever-increasing interest in distributed application technology, such as "thin" browser-based or Web-based clients. This is not because distributed applications offer a richer user experience, but instead because such applications eliminate the high costs of deploying functionality to a user's desktop.

Early distributed applications employed specialized communication protocols, such as RPC (Remote Procedure Call), CORBA (Common Object Request Broker Architecture), and DCOM (Microsoft Distributed Component Object Model), to enable program components or objects to communicate with one another regardless of what programming language they are written in or what operating system they are running on. For example, a feature-rich Windows client may use DCOM to communicate with the server and invoke remote objects. Configuring such applications to work properly in a large network is a daunting task, however. Using RPC-type protocols over the Internet also represents a security problem, as firewalls and proxy servers normally block this kind of traffic. All told, most IT professionals would rather put up with the limited functionality of browser-based applications than face the task of running DCOM-based or CORBA-based applications on their networks.

In an effort to address the problem posed by complex communication protocols, programmers have more recently turned to standard Internet protocols, such as HTTP (Hypertext Transport Protocol). For example, SOAP (Simple Object Access Protocol) is a popular way to make remote method calls to classes and objects that exist on a remote server. SOAP relies on the popular XML protocol to define the format of the information and then adds the necessary HTTP headers to send it. XML (Extensible Markup Language) is itself a basic format for representing data on a "Web services" platform. By specifying a standard way to encode parameters and return values in XML and standard ways to pass them over some common network protocols like HTTP, SOAP provides a way for applications to communicate with each other over the Internet in a manner that is independent of platform. This enables the creation of various "Web services"—that is, applications or components that are self-contained, self-describing modular applications that can be published, located, and invoked across the Internet. Web services perform functions that can range from simple requests (e.g., stock quotes) to complicated business processes (e.g., credit card transactions). Once a Web service is deployed, other applications (and other Web services) can discover and invoke the deployed service.

From the perspective of the underlying application development environments, the many existing and emerging remote procedure/method calling standards that exist today present a problem in how the various remote services are actually "bound" to an application under development, so that those services may be invoked at runtime. In particular, at the level of the development environment used to create applications, the static language binding employed for each technology (protocol) is specific, and therefore limited, to its respective technology. Here, existing "remoting" technologies require design time generation of code or type descriptions specific to both that remoting technology and the specific remote programming interface being used. This leads to proxy stub generation (i.e., static binding), such as occurs with CORBA. Although CORBA allows some degree of dynamic binding, CORBA adopts an approach that results in loss of run-time type checking. It would be more advantageous if the run-time environment could instead generate such proxies dynamically, and do so in a manner that preserves run-time type checking.

There is a need for a development environment that supports remoting technology that does not require proxy stub generation, yet supports strong runtime type checking. Further, such a development environment should be flexible as to which wire protocol and packet format are employed. The present invention fulfills this and other needs.

GLOSSARY

The following definitions are offered for purposes of illustration, not limitation, in order to assist with understanding the discussion that follows.

HTML: HTML stands for HyperText Markup Language. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML specifications. Further description of HTML documents is available in the technical and trade literature, see e.g., Duncan, R. "Power Programming: An HTML Primer," PC Magazine, Jun. 13, 1995, the disclosure of which is hereby incorporated by reference.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the W3C, and is currently available via the Internet at http://www.w3.org/Protocols/. Additional description of HTTP is available in the technical and trade literature, see e.g., Stallings, W. "The Backbone of the Web," BYTE, October 1996, the disclosure of which is hereby incorporated by reference.

SGML: SGML stands for Standard Generalized Markup Language, a system for organizing and tagging elements of a document. SGML was developed and standardized by the International Organization for Standardization (ISO), see e.g., International Organization for Standardization, ISO 8879: "Information processing—Text and office systems—Standard Generalized Markup Language (SGML)," ([Geneva]: ISO, 1986), the disclosure of which is hereby incorporated by reference. SGML itself does not specify any particular formatting; rather, it specifies the rules for tagging elements. These tags can then be interpreted to format elements in different ways. For an introduction to SGML, see e.g., "A Gentle Introduction to SGML," 1995, chapter 2 of "Guidelines for Electronic Text Encoding and Interchange (TEI)" produced by the Text Encoding Initiative, the disclosure of which is hereby incorporated by reference. A copy of "A Gentle Introduction to SMGL" is currently available via the Internet at http://www.uic.edu/orgs/tei/sgml/teip3sg/SG.htm.

SOAP: SOAP stands for Simple Object Access Protocol, which is a standard and lightweight protocol for exchanging information in a decentralized, distributed environment. It uses XML to encode remote procedure calls and typically uses HTTP as a communications protocol. For more information about SOAP, see e.g., "SOAP Version 1.2 Part 1: Messaging Framework" and "SOAP Version 1.2 Part 2: Adjuncts," both W3C working drafts dated Oct. 2, 2001, the disclosure of which are hereby incorporated by reference. Copies of these documents are available from the W3C, and are currently available via the Internet at http://www.w3.org/2000/xp/#drafts.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., RFC 793, the disclosure of which is hereby incorporated by reference. A copy of RFC 793 is currently available at http://www.ietf.org.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial," the disclosure of which is hereby incorporated by reference. A copy of RFC 1180 is currently available at ftp://ftp.isi.edu/in-notes/rfc1180.txt.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML stands for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see e.g., "Extensible Markup Language (XML) 1.0," (2nd Edition, Oct. 6, 2000) a recommended specification from the W3C, the disclosure of which is hereby incorporated by reference. A copy of this specification is currently available on the Internet at http://www.w3.org/TR/2000/REC-xml-20001006.

SUMMARY OF THE INVENTION

Prior art solutions for remote method invocation either require a design time binding to achieve proper performance and allow processor specific bindings or, alternatively, allow for runtime binding but without the benefit of a processor specific binding for both the calling convention and the type system. The present invention provides for a strongly typed language binding for a remote method call and its parameter types, while deferring to runtime the actual processor binding. This greatly reduces the amount of code that needs to be updated as the definition of any service interface evolves. It also reduces the size of any redistributable pieces of an application, while also maintaining the advantage of a processor and language binding in terms of both performance and compile-time and design-time type checking.

A language specific representation of a remote service is used at runtime to generate a processor specific binding for a remote method call. On the client side, specific code is generated at runtime to properly dispatch the remote method call as if the code was generated at compile time. On the server side, the request can be handled without any knowledge of the fact that the service is called by a remote process or machine. No service specific skeleton or stub is required on the server side. The dispatching mechanism simply reverses the transformation (serialization) of the request made on the client side, synthesizes a native call stack for a native call, and dispatches that native call.

The methodology of the present invention separates the binding of a remote service into a specific language construct from the runtime code that accomplishes the remote method call. The same language binding may be used for any number of wire protocols and network transports. On the client side, a user/developer may implement an interface to the remote service by simply casting (or instantiating) an instance of a generic interface class to create an interfaced object. This instantiated interfaced object includes an interface definition which is similar to a type library. This interface definition is an abstract description of a service that allows, for example, a client application to call a particular method or service running on a remote server without knowing the specific implementation details about how the method is implemented on the server. The compiler uses the instantiated interface object as if it was locally implemented to make the remote calls to the remote service. At runtime, this instantiated instance of the generic interface class (i.e., the interfaced object) dynamically proxies the call (or request) to the remote service when the remove service is called by a particular client application.

The interfaced object delegates the serialization of a request on a remote service into a particular wire format. The specific wire format used may be any one of a set of possible implementations, as the present invention enables use of a number of different wire formats. The interface object also delegates the transport of the wire packet to one of a set of possible implementations that uses a specific mode of transport, such as TCP/IP, HTTP, or SMTP, to send the packet to the remote service and to receive any response returned by the remote service.

The generic interface class of the present invention may also be subclassed to provide support for specific wire protocols and wire formats. A subclass is provided in the current commercial embodiment to provide support for SOAP and HTTP. An instance of this subclass may be cast as an interface to make a remote call using these protocols. However, SOAP and HTTP are only one of the possible combinations that may be utilized with the present invention. The architecture of the present invention is such that one can create many different subclasses of the generic interface class. This enables a user/developer to leverage existing functionality for dynamic proxy generation, while allowing different transports and wire formats to be plugged in for use in a particular environment.

For example, a subclass of the generic interface class in the current commercial embodiment aggregates and facilitates the utilization of the SOAP and HTTP protocols. In this subclass, the generic interface class is instantiated with specific parameters that overwrite generic functions of the generic object. Primarily, this involves implementing generic interfaces to define specific means to participate in the construction of a wire packet in a particular format (e.g., SOAP) and the transport of that packet using a particular transport (e.g., HTTP). The generic interface class provides the core functionality to handle dynamic proxy generation at runtime. The ability to subclass this generic class enables details about particular protocols and transport methods to be supplied in advance in subclasses of the generic class. Users may invoke a specific subclass when specific functionality is required to implement use of particular protocols and transport methods supported by the subclass.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows XP operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
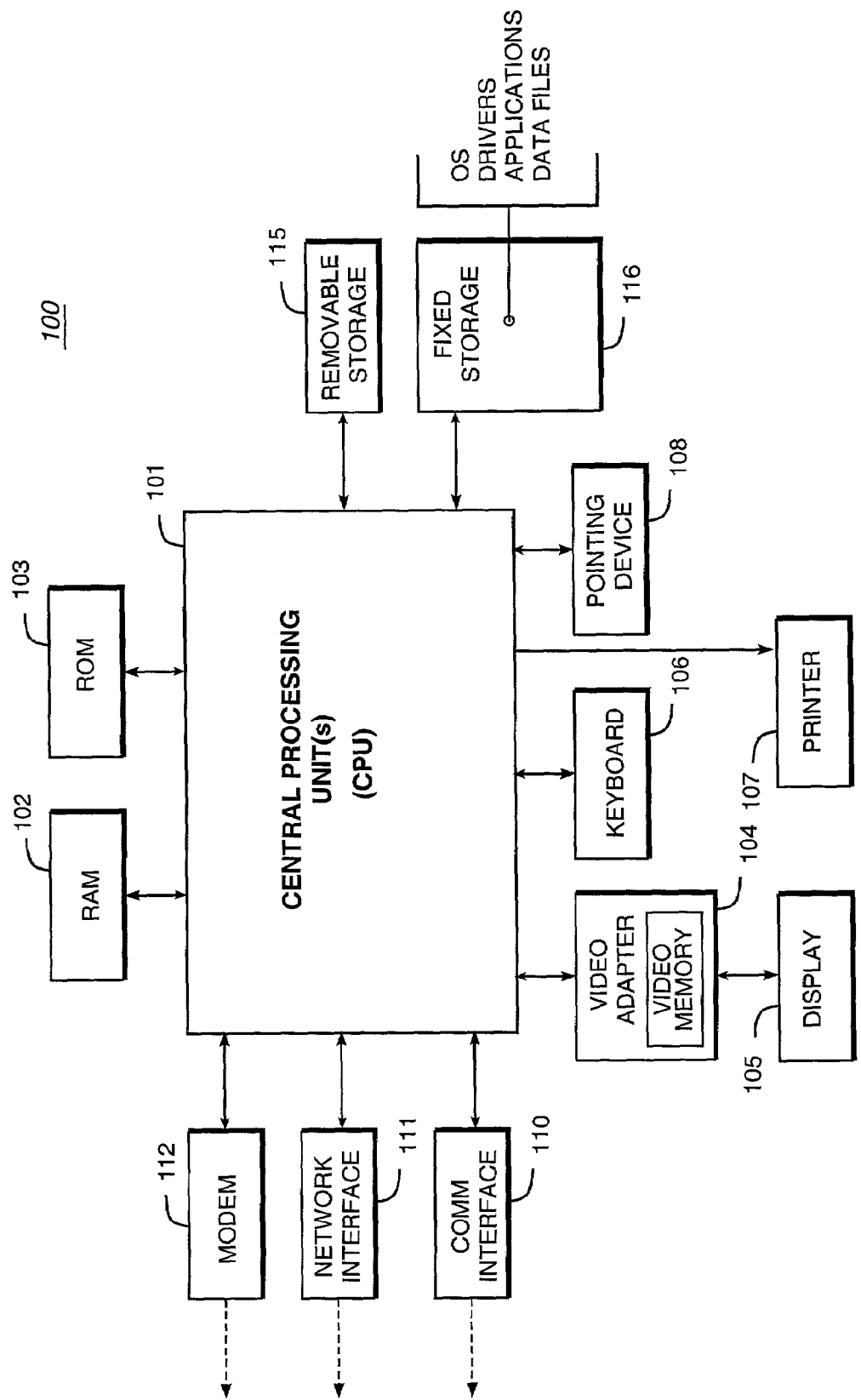
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2A:
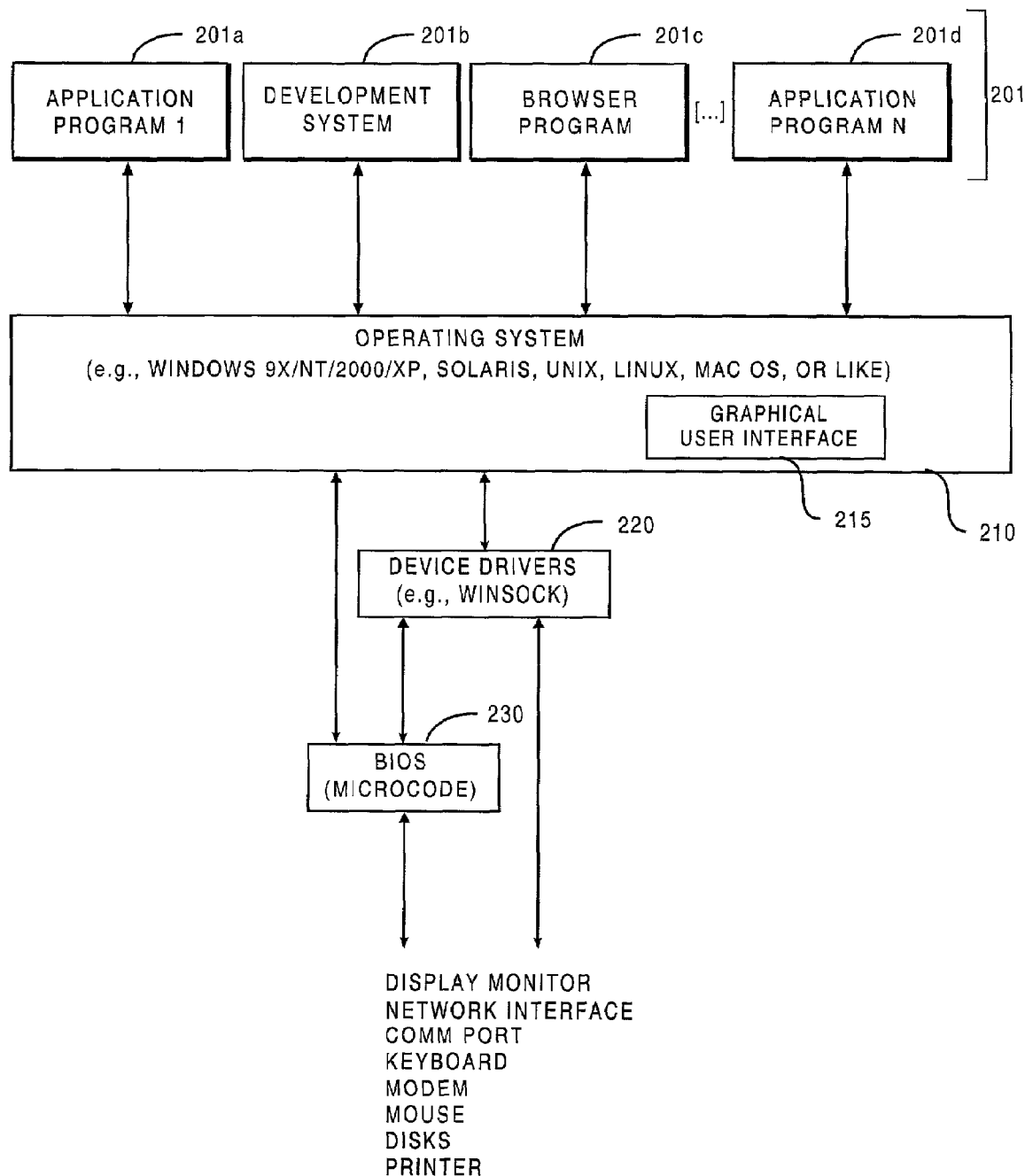
FIG. 2A is a block diagram of a software system for controlling the operation of the computer system.

Illustrated in FIG. 2A, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application or software programs, such as client application software or "programs" 201 (e.g., 201a, 201b, 201c, 201d) may be "loaded" (i.e., transferred from fixed storage 116 into memory 102) for execution by the system 100. As shown, one of the programs includes a visual development system, which is described in further detail below.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

C. Development System

Figure 2B:
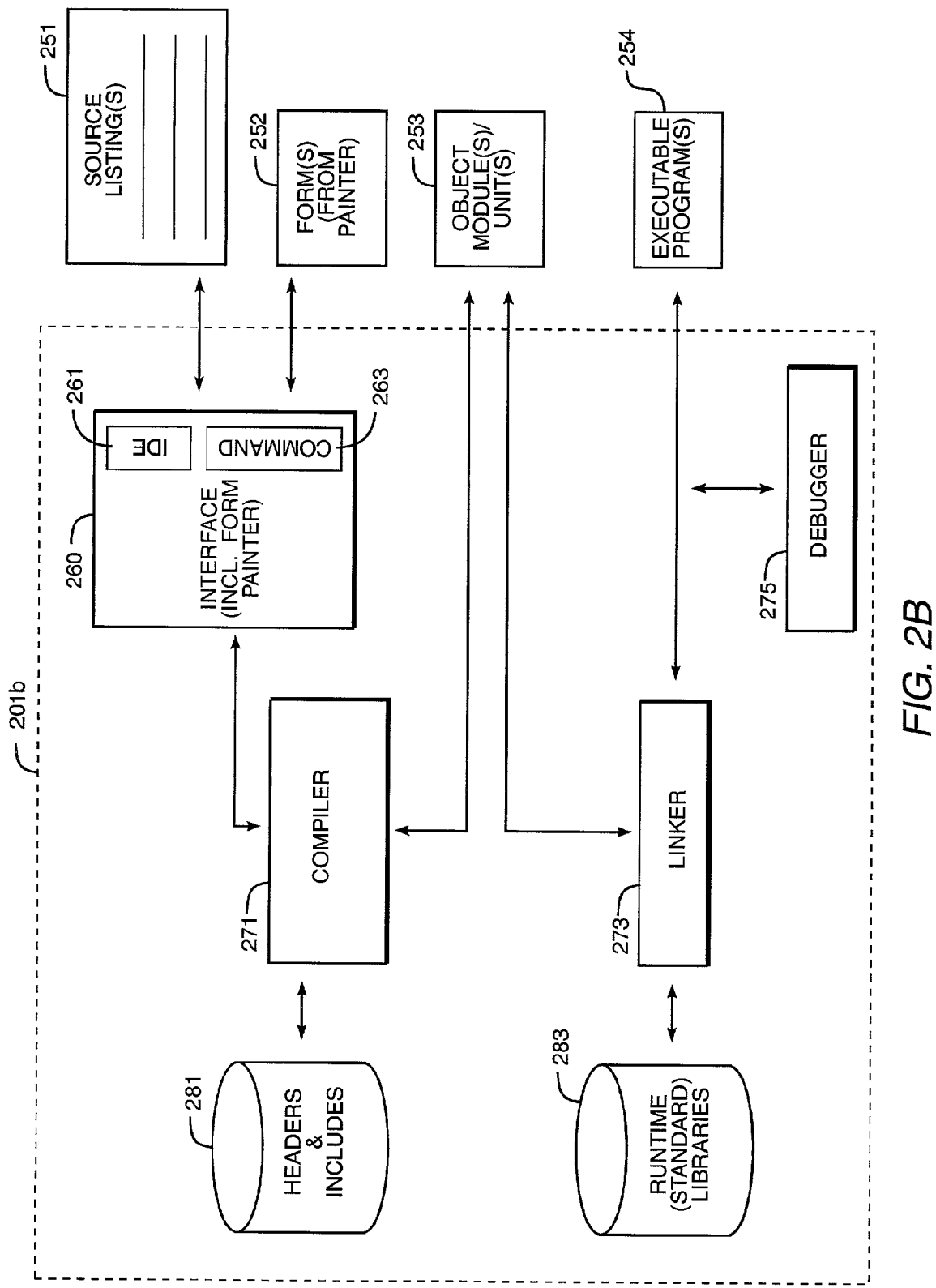
FIG. 2B is a block diagram of a visual development system in which the present invention may be embodied.

The visual development system 201b, shown in further detail in FIG. 2B, includes a compiler 271, a linker 273, and an interface 260. Through the interface, the developer user "paints" forms 252 with objects and supplies source listings 251 to the compiler 271. Interface 260 includes both command-line driven 263 and Integrated Development Environment (IDE) 261 interfaces, the former accepting user commands through command-line parameters, the latter providing menuing equivalents thereof. From the source code or listings 251, forms 252, and headers/includes files 281, the compiler 271 "compiles" or generates object module(s) or "units" 253. In turn, linker 273 "links" or combines the units 253 with runtime libraries 283 (e.g., standard runtime library functions) to generate executable program(s) 254, which may be executed by a target processor (e.g., processor 101 of FIG. 1). The runtime libraries 283 include previously-compiled standard routines, such as graphics, I/O routines, startup code, math libraries and the like. A debugger 275 facilitates discovery and correction of program errors.

In the currently preferred embodiment, the visual development system 201b comprises Delphi™ 6 (Enterprise Edition), available from Borland Software Corp. of Scotts Valley, Calif. A description of the general operation of the system is provided in the manuals accompanying Delphi™ 6: *Developer's Guide* (Part No. HDE1360WW21001-12001), and *Object Pascal Language Guide* (Part No. ALP0000WW21000-11888). The disclosures of each of the foregoing (which are available directly from Borland Software Corporation of Scotts Valley, Calif.) are hereby incorporated by reference.

D. General Development Interface

Figure 3:
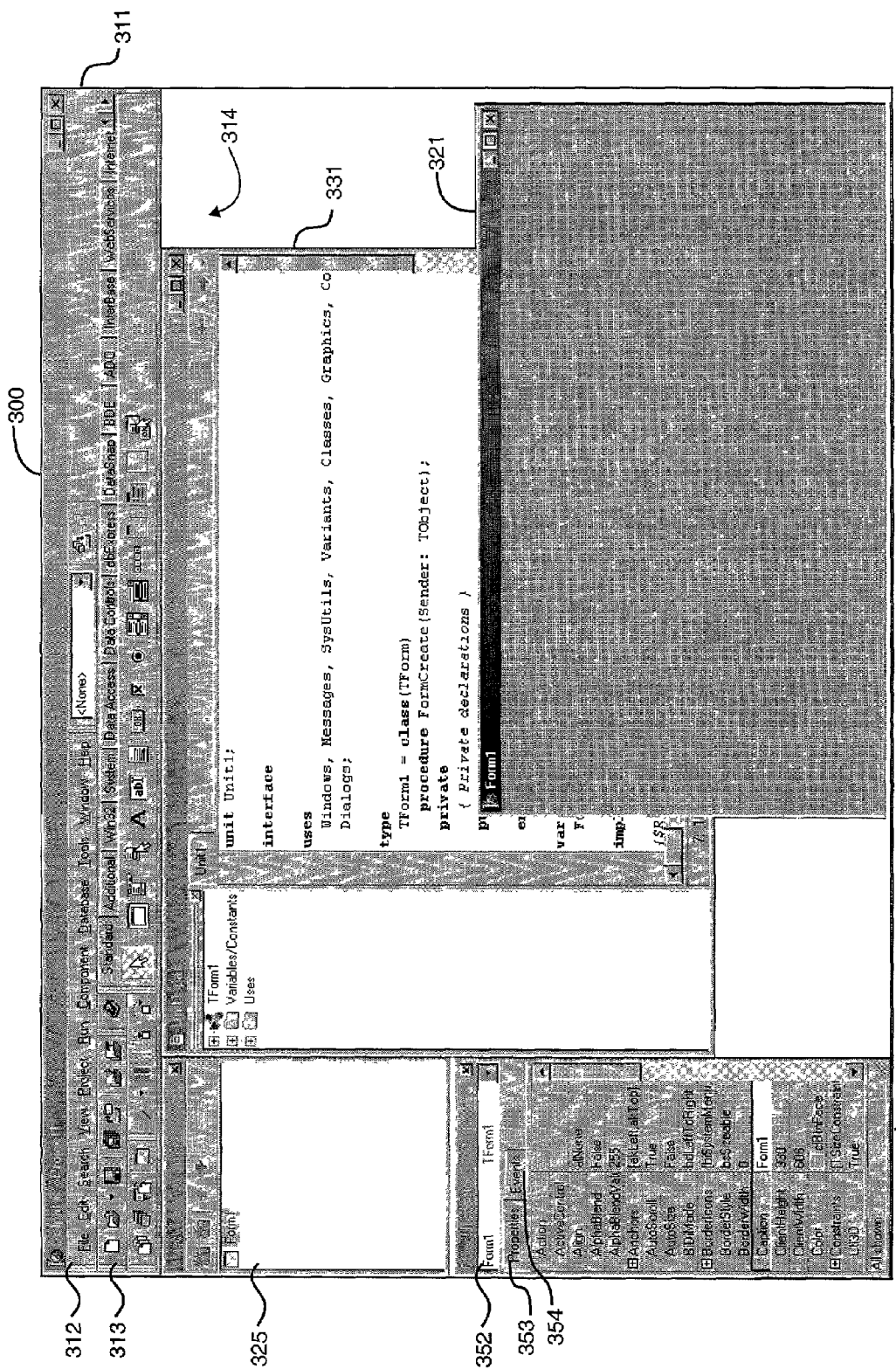
FIG. 3 illustrates a component-based, rapid application development (RAD) environment.

FIG. 3 illustrates a component-based, rapid application development (RAD) environment 300, which is provided by Delphi™. Many of the traditional requirements of programming, particularly for Windows applications, are handled for the programmer automatically by Delphi™.

As shown, the programming environment 300 comprises a main window 311, one or more forms 321, a code editor window 331, an object manager or "inspector" window 351, and an object tree view window 325. The main window 311 itself comprises main menu 312, tool bar buttons 313, and component palette 314. Main menu 312 lists user-selectable commands, in a conventional manner. For instance, the main menu invokes File, Edit, View submenus, and the like. Each submenu lists particular choices that the user can select. Working in conjunction with the main menu, toolbar 313 provides the user with shortcuts to the most common commands from the main menu. The toolbar is configurable by the user for including icons for most of the menu commands.

Forms, such as form 321, are the focal point of nearly every application that one develops in the environment. In typical operation, the user employs the form like a canvas, placing and arranging "components" on it to design the parts of one's user interface. The components themselves are the basic building blocks of applications developed within the environment. Available components appear on the component palette 314, which is displayed as part of the main window 311. The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizable borders. The user can change these features, as well as other "properties" of the form, by using the object inspector window 351 to edit the form during design time. Thus, properties define a component's appearance and behavior.

Components are the elements that a user employs to build his or her applications. They include all of the visible parts of an application, such as dialog boxes and buttons, as well as those which are not visible while the application is running (e.g., system timers). In the programming environment 300, components are grouped functionally on different pages of the component palette 314. Each functional group is identified by a tab member, which includes a label indicating the particular nature of the group. For example, components that represent the Microsoft Windows Win32 controls (e.g., tab control, page control, status bar, tool bar, and the like) are grouped on the "Win32" page of the palette. The palette can incorporate user-created custom controls, which the user installs onto the palette. Additionally, the user can install third-party components.

The object inspector window 351 enables the user to easily customize the way a component appears and behaves in the application under development. The inspector 351 comprises an object selector field 352, a properties page 353, and an events page 354. The object selector 352 shows the name and type of the currently selected object, such as "Form1," as shown. The properties page 353 lists the attributes of a component placed on a form (or the form itself) that can be customized. The events page 354, on the other hand, lists "event handlers" for a particular component. Event handlers are specialized procedures that may include user-provided program code.

The object tree view window 325 displays a tree diagram of the visual and nonvisual components the user places on a form, data module, or frame. The object tree view window 325 displays the components' logical relationships, such as sibling, parent-child (such as a form to a check box), and property relationships (such as a dataset to its field definition (FieldDefs) properties). Some of these relationships are implicit, such as a dataset component to its properties. The user can create other relationships by dragging and dropping one component on top of another (in instances where they have the possibility of a relationship).

Code editor 331 is a full-featured editor that provides access to all the code in a given application project. In addition to its basic editing functionality, the code editor 331 provides color syntax highlighting, for assisting the user with entering syntactically correct code. When a project is first opened, the system automatically generates a page in the code editor for a default unit of source code; in the Object Pascal preferred embodiment, the default unit is named Unit1.

The above-described computer hardware and software are presented for purposes of illustrating the basic underlying development system and computing environment that may be employed for implementing the present invention. For purposes of discussion, the following description will present examples in which it will be assumed that the visual development system is used to create applications software deployed in an environment having one or more "clients" (e.g., client or desktop computers) that communicate with one or more "servers" (e.g., Web servers). The present invention, however, is not limited to any particular environment or device configuration. In particular, a client/server distinction is not necessary to the invention, but is used to provide a framework for discussion. Instead, the present invention may be implemented in/deployed on any type of system architecture or processing environment capable of supporting the methodologies of the present invention presented in detail below.

II. Supporting Extensible Remoting Architecture

A. Web Services

1. Introduction

"Web Services" are self-contained modular applications that can be published and invoked over a network (such as the World Wide Web). Web Services provide well-defined interfaces that describe the services provided. Web Services are designed to allow a loose coupling between client and server. That is, server implementations do not require clients to use a specific platform or programming language. In addition to defining interfaces in a language-neutral fashion, they are designed to allow multiple communications mechanisms as well.

In the current commercial embodiment of the invention, support for Web Services is designed to work using SOAP (Simple Object Access Protocol). SOAP is a standard lightweight protocol for exchanging information in a decentralized, distributed environment. It uses XML to encode remote procedure calls and typically uses HTTP as a communications protocol. Although support for Web Services is based on SOAP and HTTP, the framework is sufficiently general that it can be expanded to use other encoding and communications protocols.

The user/developer can use the visual development system to build both servers that implement Web Services and clients that call on those services. If the developer/user employs the system to create both the server and client applications, he or she can share a single unit that defines the interfaces for the Web Services. In addition, the developer/user can write clients (i.e., client software) for arbitrary servers that implement Web Services that respond to SOAP messages, and servers (i.e., server software) that publish Web Services that can be used by arbitrary clients.

When either the client or server is not written using the current commercial embodiment of Delphi™, one can publish or import information on what interfaces are available and how to call them using a WSDL (Web Service Definition Language) document. On the server side, an application can publish a WSDL document that describes one's Web Service. On the client side, a wizard can import a published WSDL document, providing the user/developer with the interface definitions and connection information needed.

2. Writing Servers that Support Web Services

In the visual development system, servers that support Web Services are built using "invokable" interfaces. Invokable interfaces are interfaces that are compiled to include runtime type information (RTTI). This RTTI is used when interpreting incoming method calls from clients so that they can be correctly marshaled.

In addition to the invokable interfaces, and the classes that implement them, the developer's server includes two components: a dispatcher and an invoker. The dispatcher (THTTPSoapDispatcher) is a component that receives incoming SOAP messages and passes them on to the invoker. The invoker (THTTPSoapPascalInvoker) interprets the SOAP message, identifies the invokable interface it calls, executes the call and assembles the response message. THTTPSoapDispatcher and THTTPSoapPascalInvoker are designed to respond to HTTP messages containing a SOAP request. The underlying architecture is sufficiently general, however, that it can support other protocols with the substitution of different dispatcher and invoker components. Once one registers his/her invokable interfaces and their implementation classes, the dispatcher and invoker automatically handle any messages that identify those interfaces in the SOAP Action header of the HTTP request message.

3. Building a Web Service Server

The following steps illustrate how one builds a server application that implements a Web Service:

1. The user/developer defines the interfaces that make up his or her Web Service. These interface definitions should be invokable interfaces. Preferably, one creates his or her interface definitions in their own units, separate from the unit that contains the implementation classes. In this way, the unit that defines the interfaces can be included in both the server and client applications. In the initialization section of this unit, the user/developer adds code to register the interfaces.

2. If the user/developer's interface uses any complex (non-scalar) types, he or she ensures that these can be marshalled correctly. The Web Service application typically handles these using special objects containing runtime type information (RTTI) that describes their structure.

3. The user/developer defines and implements classes that implement the invokable interfaces defined in step 1. For each implementation class, the user/developer may also need to create a factory procedure that instantiates the class. In the initialization section of this unit, the user/developer adds code to register the implementation class.

4. If one's application raises an exception when attempting to execute a SOAP request, the exception will be automatically encoded in a SOAP fault packet, which is returned instead of the results of the method call. If the user/developer wants to convey more information than a simple error message, the user/developer can create his or her own exception classes that are encoded and passed to the client.

5. The user/developer invokes a "Web Services" command in the visual development system (e.g., by choosing "File |New |Other" and double-clicking on a Web Service application icon). Here, the user/developer chooses the type of Web server application he or she wants to have implement the Web Service.

6. The foregoing input invokes a wizard that generates a new Web Service application that includes an invoker component (THTTPSoapPascalInvoker) and a dispatcher component (THTTPSoapDispatcher). The invoker converts between SOAP messages and the methods of any interfaces registered in step 1. The dispatcher automatically responds to incoming SOAP messages and forwards them to the invoker. The user/developer can use a WebDispatch property to identify the HTTP request messages to which one's application responds.

7. The Web Service is added to the application under development by adding the Web Service's unit(s) to the current application's project. This is done by choosing "Project |Add To Project", and then adding the unit(s) created in steps 1 through 4 to the Web server application.

8. If the user/developer wants the application to work with clients that are not written using the commercial embodiment of Delphi, he or she publishes a WSDL document that defines those interfaces and how to call them.

4. Defining Invokable Interfaces

To create an invokable interface, the user/developer need only compile an interface with a special compiler option (e.g., the Delphi {$M+} directive, which instructs the compiler to generate the additional runtime type information (RTTI) needed for remotable invocations). The descendant of any invokable interface is also invokable. However, if an invokable interface descends from another interface that is not invokable, clients of one's Web Service server can only call the methods defined in the invokable interface and its descendants. Methods inherited from the non-invokable-ancestors are not compiled with type information and so cannot be called by clients. The visual development system defines a base invokable interface, IInvokable, which can be used as the basis of any interface exposed to clients by a Web Service server. IInvokable is the same as the base interface (IInterface), except that it is compiled using the {$M+} compiler option so that it and all its descendants are compiled to include RTTI.

For example, the following code defines an invokable interface that contains two methods for encoding and decoding numeric values:
IEncodeDecode=interface (IInvokable)
['{C527B88F-3F8E-1134-80e0-01A04F57B270}']
    function EncodeValue(Value: Integer): Double; stdcall;
    function DecodeValue(Value: Double): Integer; stdcall;
end;

Before a Web Service application can use this invokable interface, it is first registered with an invocation registry. On the server, the invocation registry (entry) allows the invoker component (THTTPSoapPascalInvoker) to identify an implementation class to use for executing interface calls. On client applications, an invocation registry entry allows components to look up information that identifies the invokable interface and supplies information on how to call it. In the initialization section of the unit that defines the interface, the user/developer adds code to register the interface with the invocation registry. To access the invocation registry, one adds a corresponding InvokeRegistry unit to the uses clause of one's unit. The InvokeRegistry unit declares a global variable, InvRegistry, which maintains in memory a catalog of all registered invokable interfaces, their implementation classes, and the factories that create instances of the implementation classes.

The following is a sample unit that defines the interface (when the user/developer is finished):
unit EncodeDecode;
interface
type
IEncodeDecode=interface (IInvokable)
['{C527B88F-3F8E-1134-80e0-01A04F57B270}']
    function EncodeValue(Value: Integer): Double; stdcall;
    function DecodeValue(Value: Double): Integer; stdcall;
end;
implementation
uses InvokeRegistry;
initialization
InvRegistry.RegisterInterface (Typeinfo (IEncodeDecode));
end.

Because the interfaces of Web Services must have an XML namespace to identify them among all the interfaces in all possible Web Services, when one registers an interface the invocation registry automatically generates a namespace for the interface. The default namespace is built from a string that uniquely identifies the application (the AppNamespacePrefix variable), the interface name, and the name of the unit in which it is defined.

Typically, one keeps the unit that defines invokable interfaces separate from the unit in which one writes the classes that implement them. This unit can then be included in both the client and the server application. Because the generated namespace includes the name of the unit in which the interface is defined, sharing the same unit in both client and server applications enables them to automatically use the same namespace.

5. Using Complex Types in Invokable Interfaces

The invoker component (THTTPSoapPascalInvoker) delegates to a class that automatically knows how to marshal scalar types on invokable interfaces in the case of encoding specified in the SOAP 1.1 specification, section 5, this is class is TOPToSoapDomConvert. It can also handle dynamic arrays, as long as they are registered with the remotable class registry. However, if one wants to transmit data in more complex types such as static arrays, interfaces, records, sets, or classes, then one adds support in the form of a class that includes runtime type information (RTTI), which the invoker can use to convert between data in the SOAP stream and type values.

TRemotable is used as a base class when defining a class to represent a complex data type on an invokable interface. For example, in the case where one would ordinarily pass a record as a parameter, one would instead define a TRemotable descendant where every member of the record is a published property on one's new class. If the value of one's new TRemotable descendant represents a scalar type in a WSDL document that does not correspond to an Object Pascal scalar type, the user should use TRemotableXS as a base class instead. TRemotableXS is a TRemotable descendant that introduces two methods for converting between one's new class and its string representation. These methods are provided by overriding the XSToNative and NativeToXS methods.

In the initialization section of the unit that defines the TRemotable descendant, the user/developer registers this class with the remotable class registry. The remotable class registry is accessed by adding the InvokeRegistry unit to the uses clause. This unit declares a global variable, RemClassRegistry, which maintains a catalog of all registered remotable classes, and an indication of whether their values can be transmitted as strings. For example, the following illustrates the registration of TXSDateTime, a TRemotable descendant that represents TDateTime values:

RemClassRegistry.RegisterXSClass(TXSDateTime,
    XMLSchemaNameSpace, 'dateTime', True);

The first parameter is the name of the TRemotable descendant. The second is a uniform resource identifier (URI) that uniquely identifies the namespace of the new class. If one supplies an empty string, the registry can generate a URI automatically. The third parameter is the name of the data type the user/developer's class represents. If one supplies an empty string, the registry simply uses the class name. The last parameter indicates whether the value of class instances can be transmitted as a string (whether the user/developer implemented the XSToNative and NativeToXS methods).

Preferably, one implements and registers TRemotable descendants in a separate unit from the rest of the server application, including from the units that declare and register invokable interfaces. In this way, one can use the unit that defines the type in both the client and server, and one can use the type for more than one interface.

If the user/developer is using dynamic arrays for parameters, he or she does not need to create a remotable class to represent them, but instead registers them with the remotable class registry. Thus, for example, if one's interface uses a type such as the following:

type
    TDateTimeArray=array of TXSDateTime;

The following registration is added to the initialization section of the unit where the user/developer declared this dynamic array:

RemClassRegistry.RegisterXSInfo(TypeInfo(TDateTimeArray), MyNameSpace, 'DTarray', False);

The parameters are the same as those used by RegisterXSClass, except for the first one, which takes a pointer to the type information of the dynamic array rather than a class reference.

6. Creating and Registering the Implementation

The simplest way to write an implementation for an invokable interface is to create a class that descends from TInvokableClass. Here, the user/developer adds the class declaration, including the invokable interfaces to be supported, and then invokes class completion (command). The interface members appear in one's class declaration, and empty methods appear in the implementation section of the unit.

For example, a sample declaration for an implementation class that implements the interface declared above (in "Defining invokable interfaces") appears as follows:

TEncodeDecode=class(TInvokableClass, IEncodeDecode)
protected
function EncodeValue(Value: Integer) Double; stdcall;
function DecodeValue(Value: Double): Integer; stdcall;
end;

In the implementation section of the unit that declares this class, the user/developer fills in the EncodeValue and DecodeValue methods to provide implementation-specific functionality.

Once one has created an implementation class, the class is registered with the invocation registry. The invocation registry uses this information to identify the class that implements a registered interface and to make it available to the invoker component when the invoker needs to call the interface. To register the implementation class, one adds a call to the RegisterInvokableClass method of the global InvRegistry variable to the initialization section of one's implementation unit, for example, as follows:

InvRegistry.RegisterInvokableClass (TEncodeDecode);

One can also create implementation classes that do not descend from TInvokableClass. In this case, however, one provides a factory procedure that the invocation registry can call to create instances of the class.

The factory procedure is, in the currently preferred embodiment, of type TCreateInstanceProc. It returns an instance of the implementation class. If the procedure creates a new instance, the object should free itself when the reference count on its interface drops to zero, as the invocation registry does not explicitly free object instances. As an alternative, the factory procedure can return a reference to a global instance that is shared by all callers. The following code illustrates this latter approach:

procedure CreateEncodeDecode(out obj: TObject);
begin
    if FEncodeDecode=nil then
begin
FEncodeDecode:=TEncodeDecode.Create;
{save a reference to the interface so that the global instance doesn't free itself}
FEncodeDecodeInterface:=FEncodeDecode as IEncodeDecode;
end;
obj:=FEncodeDecode; {return global instance}
end;

When using a factory procedure, the user/developer supplies the factory procedure as a second parameter to the RegisterInvokableClass method, as follows:

InvRegistry.RegisterInvokableClass     (TEncodeDecode, CreateEncodeDecode);

7. Creating Custom Exception Classes for Web Services

When one's Web Service application raises an exception in the course of trying to execute a SOAP request, it automatically encodes information about that exception in a SOAP fault packet, which it returns instead of the results of the method call. The client application then raises the exception. By default, the client application merely raises a generic exception (Exception) with the error message in the SOAP fault packet. However, one can transmit additional exception information by using an exception class that descends from ERemotableException. The values of any published properties one adds to his or her exception class are included in the SOAP fault packet so that the client can raise an equivalent exception.

To use an ERemotableException descendant, the user/developer registers it with the remotable class registry. Thus, in the unit that defines one's ERemotableException descendant, the user/developer adds the InvokeRegistry unit to the uses clause and adds a call to the RegisterXSClass method of the global RemClassRegistry variable. If the client uses the same unit that defines and registers the ERemotableException descendant, then when it receives the SOAP fault packet, it automatically raises an instance of the appropriate exception class, with all properties set to the values in the SOAP fault packet.

8. Generating WSDL Documents for a Web Service Application

If one includes the same units that define and register one's invokable interfaces, the classes that represent complex type information, and one's remotable exceptions in a (Delphi) client application, it can generate calls to use one's Web Service. All the user/developer needs to do is supply the URL where the Web Service application is installed.

However, one may want to make his or her Web Service available to a wider range of clients. For example, one may have clients that are not written in the commercial embodiment of Delphi. If the user/developer is deploying several versions of his or her server application, he or she may not want to use a single hard-coded URL for the server, but rather let the client look up the server location dynamically. For these cases, the user/developer may want to publish a WSDL document that describes the types and interfaces in his or her Web Service, with information on how to call them.

To publish a WSDL document that describes a Web Service, one simply adds a TWSDLHTMLPublish component to his or her Web Module. TWSDLHTMLPublish is an auto-dispatching component, which means it automatically responds to incoming messages that request a list of WSDL documents for one's Web Service. A WebDispatch property is used to specify the path information of the URL clients use to access the list of WSDL documents. The Web browser can then request a list of WSDL documents by specifying an URL that is made up of the location of the server application followed by the path in the WebDispatch property. An example URL may, for instance, appear as follows:
http://www.myco.com/MyService.dll/WSDL If one wants a physical WSDL file instead, he or she can display the WSDL document in his or her Web browser and then save it to generate a WSDL document file.

It is not necessary to publish the WSDL document from the same application that implements one's Web Service. To create an application that simply publishes the WSDL document, one omits the units that contain the implementation objects, and only includes the units that define and register invokable interfaces, remotable classes that represent complex types, and any remotable exceptions.

By default, when one publishes a WSDL document, it indicates that the services are available at the same URL as the one where the WSDL document is published (but with a different path). If one is deploying multiple versions of his or her Web Service application, or if one is publishing the WSDL document from a different application than the one that implements the Web Service, the WSDL document is changed so that it includes updated information on where to locate the Web Service. The visual development system includes a WSDL administrator that may be used to change the URL. The WSDL administrator may be used to specify the locations (URLs) where one has deployed his or her Web Service application.

9. Writing Clients for Web Services

The visual development system of the present invention provides client-side support for calling Web Services that use a SOAP-based binding. These Web Services can be supplied by a server written in Delphi, or by any other server that defines its Web Service in a WSDL document. If the server is not written in Delphi, the user/developer can first import the WSDL document that describes the server. If the server was written using Delphi, the user/developer does not need to use a WSDL document. Instead, he or she can simply add any units that define the invokable interfaces he or she wants to use in a project, as well as any units that define remotable classes that represent complex types and that define remotable exceptions that the Web Service application can raise.

10. Importing WSDL Documents

Before one uses a Web Service that was not written using Delphi, one first imports a WSDL document (which also may reference an XML schema file) that defines the service. The visual development system includes a Web Services importer that creates a unit that defines and registers the interfaces and types one needs to use.

To use the Web Services importer, the user/developer chooses "File |New |Other" and then double-clicks an icon labeled "Web Services importer." In the dialog that appears, the user/developer specifies the file name of a WSDL document (or XML schema file) or provides the URL where that document is published. Upon the user invoking a Generate command, the importer creates new units that define and register invokable interfaces for the operations defined in the document, and that define and register remotable classes for the types that the document defines.

If the WSDL document or XML schema file uses identifiers that are also Object Pascal keywords, the importer automatically adjusts their names so that the generated code can compile. When complex types are declared inline, the importer adds code to define and register the corresponding remotable class in the same unit as the invokable interface that uses them. Otherwise, types are defined and registered in a separate unit.

11. Calling Invokable Interfaces

To call an invokable interface, one's client application includes any units that define the invokable interfaces and any remotable classes that implement complex types. If the server is written in Delphi™, these should preferably be the same units that the server application uses to define and register these interfaces and classes. It is preferable to use the same unit, because when one registers an invokable interface or remotable class, it is given a uniform resource identifier (URI) that uniquely identifies it. That URI is derived from the name of the interface (or class) and the name of the unit in which it is defined. If the client and server do not register the interface (or class) using the same URI, they do not communicate properly. If one does not use the same unit, the code that registers the interface and implementation class should explicitly specify a namespace URI to ensure that client and server use the same namespace. If the server is not written in Delphi, or if the user/developer does not want to use the same unit in the client that he or she used in the server, these units can be created by the Web Services importer.

Once the client application has the declaration of an invokable interface, the user/developer creates an instance of THTTPRio for the desired interface:

X:=THTTPRio.Create(nil);

Next, the user/developer provides the THTTPRio object with the information it needs to identify the server interface and locate the server. There are two ways to supply this information. If the server is written in Delphi, the identification of the interface on the server is handled automatically, based on the URI that is generated for it when the interface is registered. One need only set the URL property to indicate the location of the server. The path portion of this URL should match the path of the dispatcher component in the server's Web Module, for example as follows:

X.URL:='http://www.myco.com/MyService.dll/SOAP/';

If the server is not written in Delphi™, THHTPRio must look up the URI for the interface, the information that must be included in the SOAP Action header, and the location of the server from a WSDL document. One can specify this information using the WSDLLocation, Service, and Port properties in a manner such as the following:

X.WSDLLocation:='Cryptography.wsdl';
X.Service:='Cryptography';
X.Port:='SoapEncodeDecode';

One can then use the as operator to cast the instance of THTTPRio to the invokable interface. When one does this, a virtual table (vtable) is created for the associated interface dynamically in memory, enabling one to make interface calls:

InterfaceVariable:=X as IEncodeDecode;
Code:=InterfaceVariable.Encodevalue (5);

THHTPRio relies on the invocation registry to obtain information about the invokable interface. If the client application does not have an invocation registry, or if the invokable interface is not registered, THHTPRio can't build its in-memory virtual table.

B. Components of Extensible Remoting Architecture

The extensible remoting architecture of the present invention, in its current commercial embodiment, is implemented as a series of runtime libraries defining interfaces and providing specific implementation details such as runtime type information. For example, an interface definition of a particular Web Service may include the name of every method, the name of every parameter, the type of every parameter, the calling convention used, the qualifiers for every parameter and other such details. This enables this information to be complied into an executable application program so that this information survives and is available at runtime in the context of dynamic proxy generation for remote invocation of that Web Service.

Figure 4:
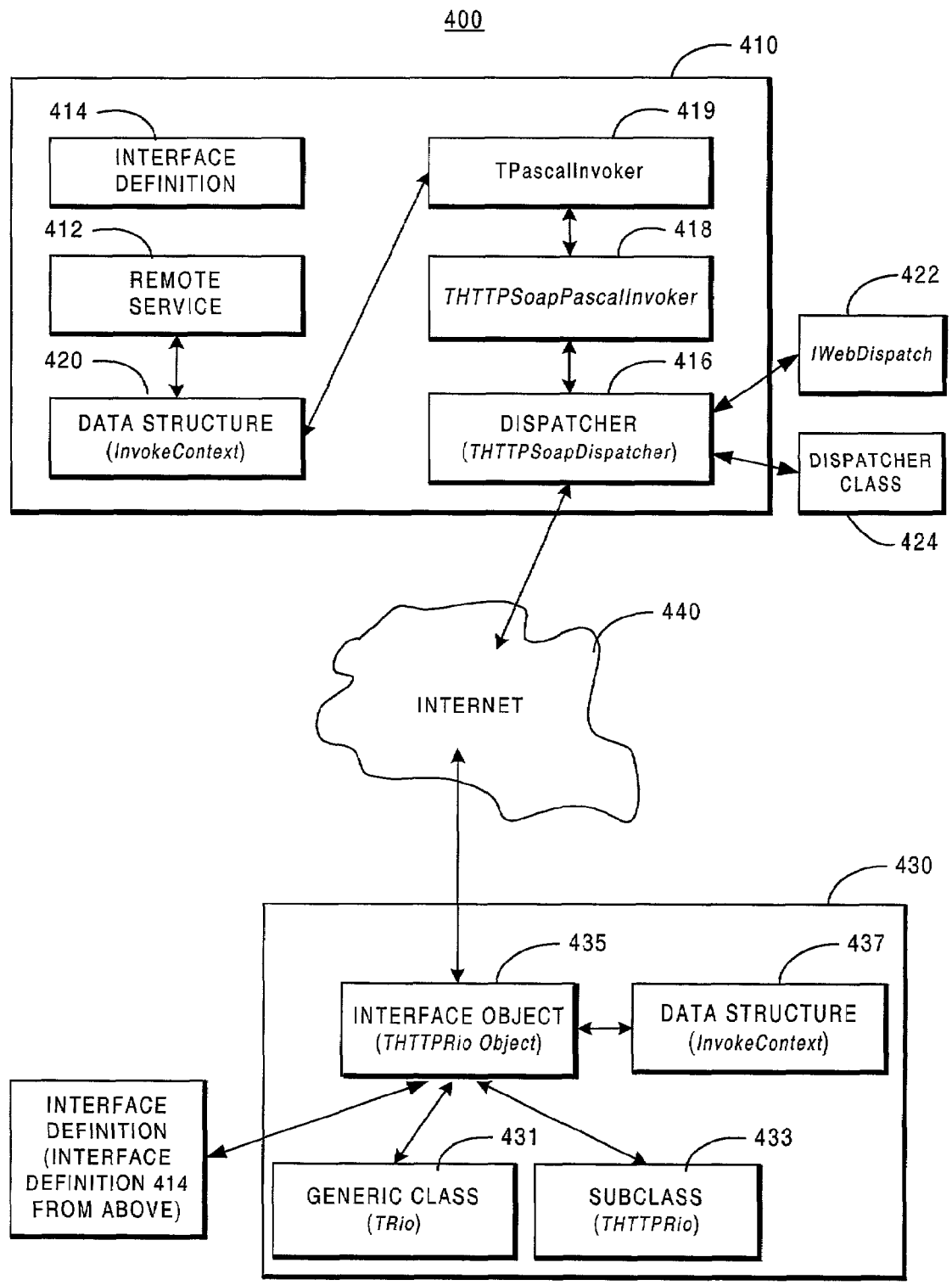
FIG. 4 is a block diagram of the components of an exemplary implementation of the present invention.

FIG. 4 illustrates the components of an exemplary implementation of the present invention involved in the remote invocation of a Web Service by a client. As shown at FIG. 4, server side components are installed on a Web server 410 and client side components are installed on a client machine 430. The components of an exemplary implementation on Web server 410 include a Web Service 412, an invokable interface or interface definition 414, a dispatcher 416, a THTTPSoapPascalInvoker 418, a TPascalInvoker 419, and a data structure 420, as shown on FIG. 4. Dispatcher 416 and THTTPSoapPascalInvoker 418 are derived from an IWebDispatch class 422 which implements a dispatcher class 424. On the client side, a generic interface class 431, a subclass 433 of the generic interface class, an interface object 435, and a data structure 437 are installed on a client machine 430. Interface object 435 is generated based on generic interface class 431, subclass 433, and an interface definition of a particular Web Service (e.g., interface definition 414 of Web Service 412). Client machine 430 is shown connected to the Web server via the Internet 440.

As previously described, on the client side, a user/developer remotely invoking a specific Web Service starts with an invokable interface or interface definition of that service, which includes encapsulated runtime type information for the service. As shown at FIG. 4, interface definition 414 of Web Service 412 is used on the client side to implement an interface to that service. As previously described in the section entitled "defining invokable interfaces," the Delphi visual development system defines a base invokable interface, IInvokable, which can be used as the basis of any interface exposed to Delphi clients by a Web Service server. Alternatively, the user/developer of a client application may start with a WSDL document that describes the types and interfaces in a particular Web Service, together with information on how to call that service.

For example, a developer/user may want to add functionality to a particular application to track the delivery status of overnight courier packages by remotely invoking a service provided by a courier company and available via an open network (e.g., a Federal Express package tracking application available via the Internet). This particular Web Service may, for example, include a method called "GetCurrentStatus" that returns the delivery status of a particular package given a particular parameter (the tracking number) and a return value. This is an example of a specific Web Service provided by a third party, having a published interface, and available remotely over the Internet. A developer/user can use the external interface definition of this service (e.g., the WSDL for this service) at design time together with the generic interface class 431, named TRio (a Remote Interfaced Object), to provide client-side support for calling this Web Service remotely. If applicable, the developer/user can also utilize a subclass 433 of the generic class that extends the generic class by introducing a particular wire format and transport. For example, the user/developer can utilize THHTPRio, for implementation of SOAP wire format and HTTP transport.

At design time, a subclass (THTTPRio) 433 of the generic class (TRio) 431 is combined using a casting operator with an interface definition of the remote service to instantiate an interface object (a THTTPRio object) 435 for a specific wire format and transport (e.g., SOAP and HTTP in this example). Interface object 435 is the dynamically generated proxy that is used to make remote method calls over the network to Web Service 412. The user/developer also provides the THHTPRio object with the information necessary to identify the Web Service's interface and locate the server on which the Web Service is available.

At runtime, the instantiated THHTPRio object 435 handles calls to the remote "GetCurrentStatus" method on Web server 410. The THHTPRio object dynamically generates the proxies to make remote procedure calls, manages these calls, and handles receipt of any information returned by the remote service. This interface object (THTTPRio) 435 on the client side delegates to an implementation of the IWebNode interface which communicates with the remote server, and delegates to an implementation of the IOPConvert interface to serialize/deserialize the data for the remote call using a data structure (InvokeContext or InvContext) 437 on the client machine. Given a particular client request on the remote Web Service, the THTTPRio interface object turns the request into a wire protocol (a stream) using an instance of the IOPConvert interface. Then this stream is sent in a packet to the designed remote server using a particular transport using an instance of the IWebNode interface. In this example, the packet is sent via HTTP over the Internet 440 to Web server 410.

On Web server 410, the dispatcher (THHTPSoapDispatcher) 416, which in this exemplary implementation is implemented as part of a Web server module, looks for remote requests on Web Service 412 (e.g., requests to the "GetCurrentStatus" method). Dispatcher 416 is generic to enable it to process SOAP requests received from various remote clients. Dispatcher 416 is derived from IWebDispatch class 422, which implements a dispatcher class 424. Additional protocols and wire formats may be implemented from generic dispatcher class 424 to listen for requests in formats other than SOAP and HTTP. As shown at FIG. 4, dispatcher 416 is implemented on Web server 410. However, a user/developer may, alternatively, create a particular class that listens for a particular proprietary binary format to be received over an email system and invokes a native service in the manner described below. THTTPSoapDispatcher 416 listens for HTTP posts containing SOAP requests, determines which local class or method implements the request, creates an instance of the InvokeContext data structure 420, and delegates the invocation of the local class or method to an invoker, in this case THHTPSoapPascalInvoker 418.

In this case, dispatcher 416 receives a SOAP request over HTTP and delegates the request to THTTPSOAPPascalInvoker 418, an implementation of the THTTPSoapDispatch interface. THTTPSOAPPascalInvoker 418 delegates the request to an implementation of IOPConvert, in this case TOPToSoapDomConvert, to convert the SOAP message into the internal InvokeContext data structure that represents the call in a message format independent way. THHTPSoapPascalInvoker 418 makes the local call to invoke the registered Web Service 410 (e.g., the "GetCurrentStatus" method to find and return the current delivery status of a particular courier package).

THTTPSoapPascalInvoker delegates to an instance of TPascalInvoker 419 to invoke the method by synthesizing a stack frame from the InvokeContext generic data structure specific to that method and containing the appropriate parameters for making a native call on the method. In this manner, the remote method call appears, from the standpoint of the Web Service, to be the same as a local call. TPascalInvoker 419 also reads any return value into the InvokeContext data structure 420. THHTPSoapPascalInvoker 418 delegates to an implementation of IOPConvert, in this case TOPToSOAPDomConvert, to take the return values in the InvokeContext, convert (or reserialize) these return values into a particular wire format, and return a packet to the client (i.e., interface object 435 on client machine 430 making this remote call) through a particular method of transport.

The interface object (THTTPRio) 435 on the client machine receives the packet returned by the remote server through the IWebNode interface to which it has delegated the transport, and delegates to an IOPConvert interface which serves as the deserialize interface. On the client side, THHTPRio, through the IWebNode and IOPConvert interfaces, serves a role similar to that of the dispatcher on the Web server by receiving and deserializing return packets into the client side InvokeContext data structure 437. In this manner, the present invention enables one to plug in serializers and deserializers as well as transport layers on both the client side and the server side to facilitate remote method invocation.

C. Detailed Method Steps for Remote Method Invocation

Figure 5A:
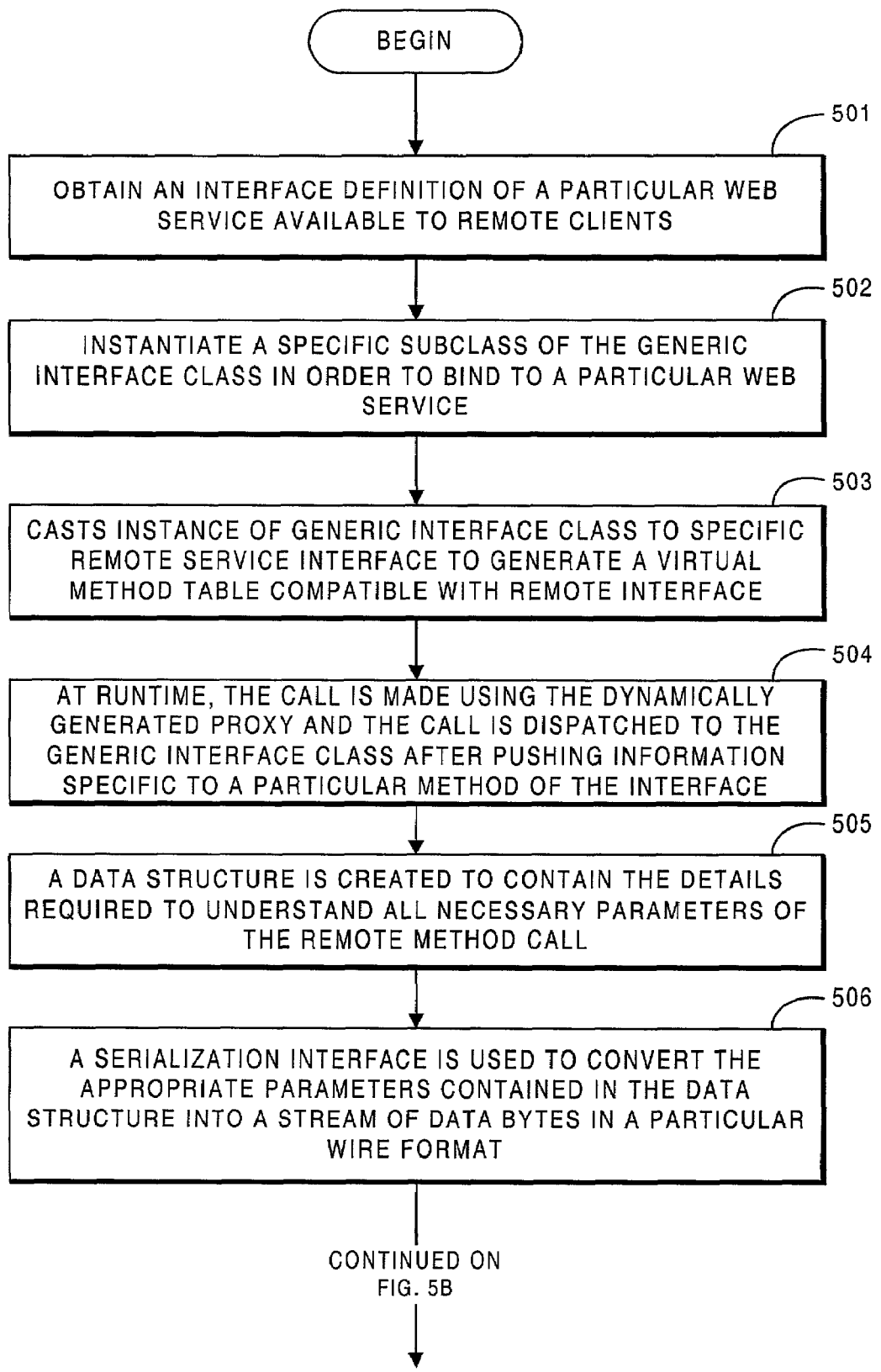
FIGS. 5A–B comprise a single flowchart illustrating the detailed method steps of the operation of the present invention on the client side of an exemplary remote method call from a client application.
Figure 5B:
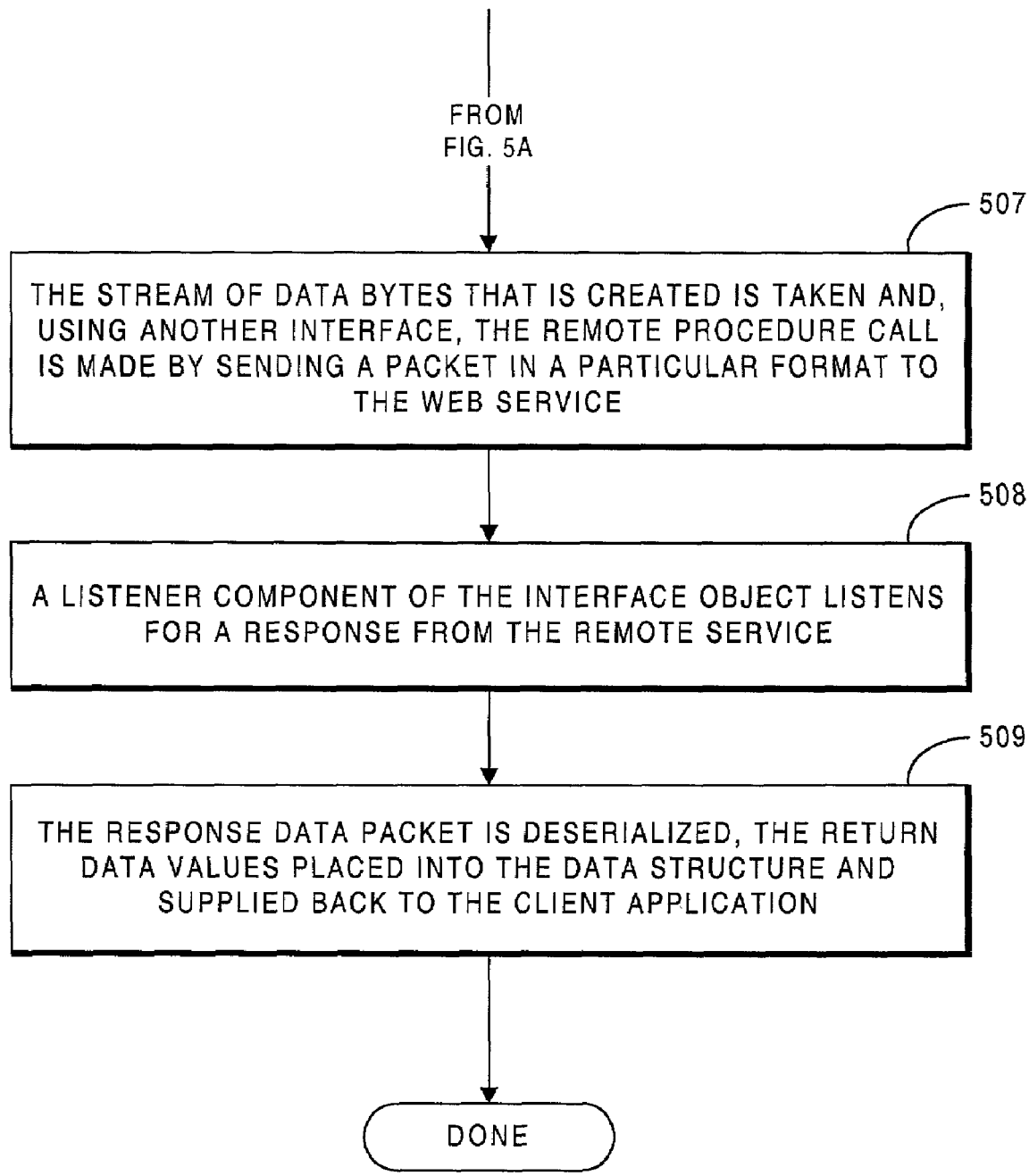
Figure 6A:
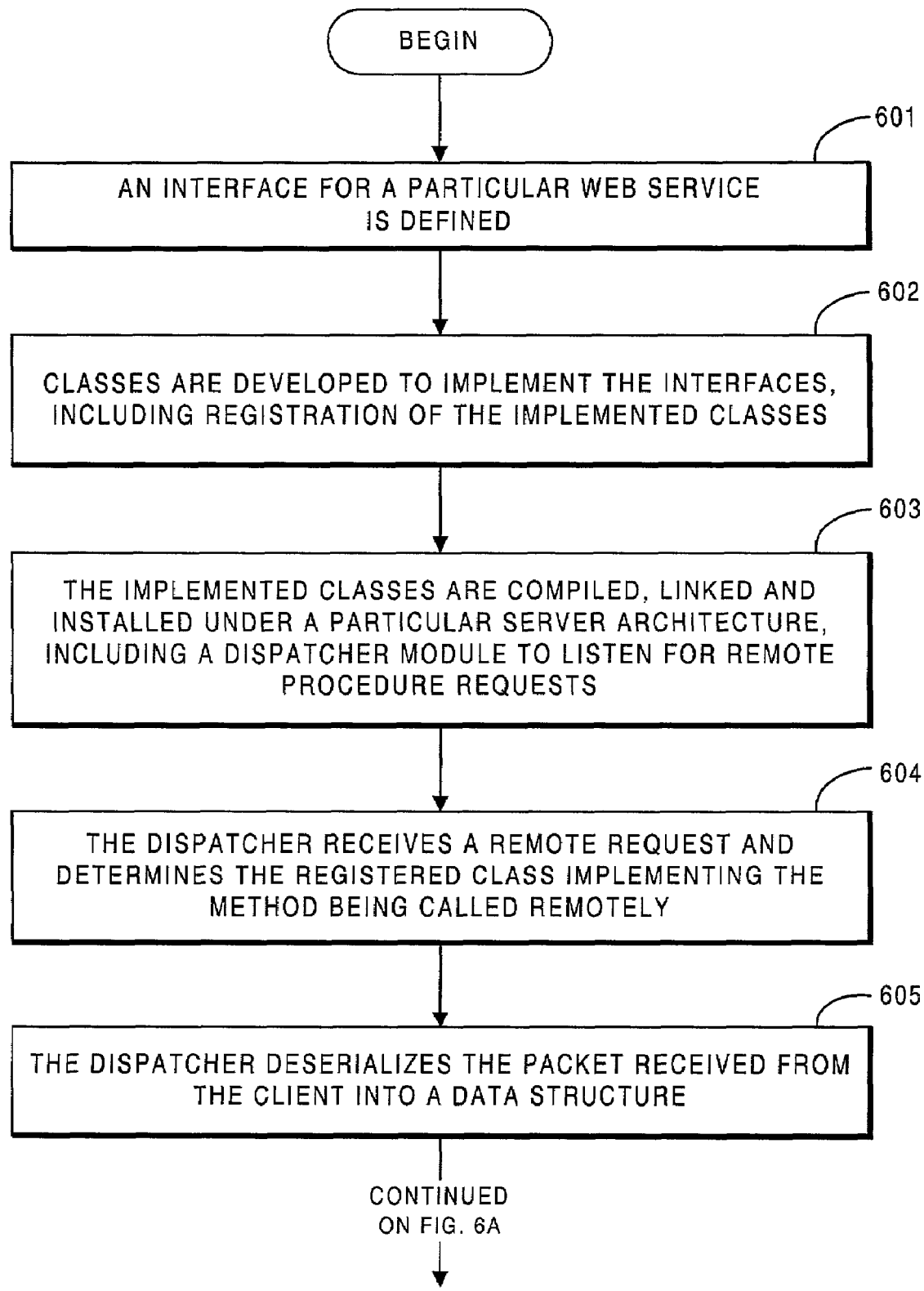
FIGS. 6A–B comprise a single flowchart illustrating the detailed method steps of the operation of the present invention on the server side of an exemplary remote method call.
Figure 6B:
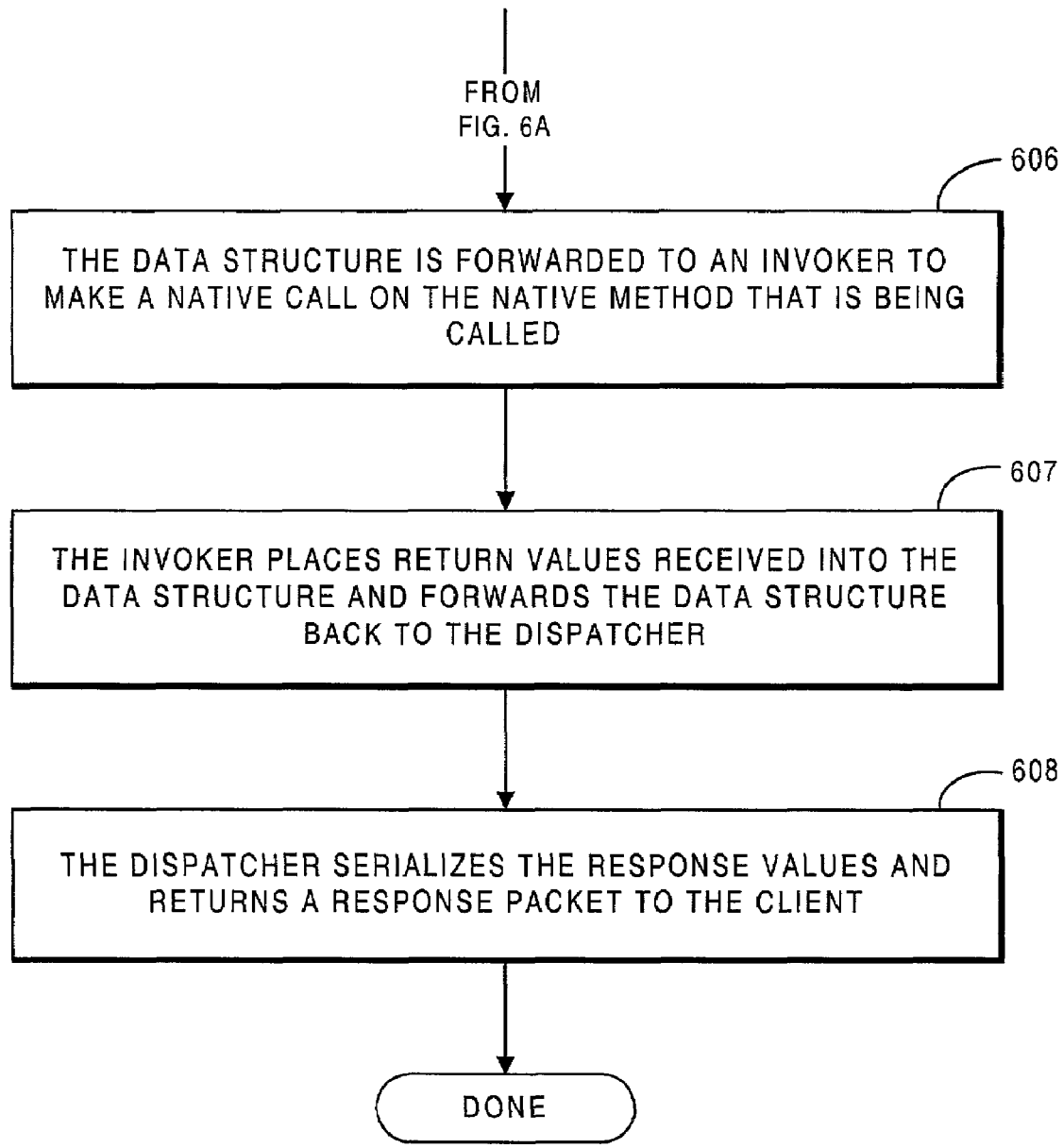

Utilization of the present invention for remote method invocation involves a sequence of operations by both the client application making the remote method call and on the Web Service responding to the remote method call. FIGS. 5A–B and 6A–B illustrate an exemplary remote method call on a Web Service that is made using a particular wire format and transport (e.g., SOAP and HTTP). FIGS. 5A–B comprise a single flowchart illustrating the detailed method steps of the operations of the present invention on client application side of an exemplary remote method call. FIGS. 6A–B comprise a single flowchart illustrating the operations of the present invention on the Web server side for an exemplary remote method call of a service available on such Web server. Although the following discussion uses SOAP and HTTP as an example, the architecture of the present invention is sufficiently general that it can be used with other encoding and communications protocols.

1. Client Side Operations

A user/developer utilizing the present invention for a client application including remote invocation of a remote service begins, at step 501, by obtaining an interface definition of a particular service. This remote service may be private (such as a server application being developed by the same user/developer) or may be a publicly available service, such as a third party Web Service available over the Internet. If a publicly available service, the remote service will have a published interface definition and will be available over a particular transport and wire format. For example, a user/developer may want to integrate a new client application that he or she is developing with a third party Web Service having a published interface definition and available via the Internet using SOAP and HTTP (e.g., the Federal Express shipping application with a published interface as described above).

At step 502 the user/developer instantiates a specific subclass (THTTPRIO) of the generic interface class (TRIO) to bind and prepare to implement the interface of a specific remote service to the HTTP transport and the SOAP wire format. As step 503, the user/developer casts the instance of the generic interface class to a specific remote service interface. At runtime, the generic interface class will synthesize an interface for the particular remote service. The generated interface consists of a virtual method table compatible with this interface that dispatches all method calls of this interface to a generic proxy implemented in the generic interfaced class (TRIO). This virtual method table consists of calls to a dynamically generated method, which pushes on the program stack the number of the method being called and the calling convention of the method. This dynamically generated method then calls a generic stub implemented in the generic interfaced class (TRIO) which can use the information pushed in the dynamically generated method to determine how to correctly interpret the data on the program stack that was generated for any particular method call. In this example, the user/developer wants to include functionality in his or her application to use a remote service for tracking the location or status of a particular courier package. This remote service returns a return value, such as the name of a city where the package is currently located. The developer's application would make a call on this particular service by including a line of code such as the following:

'return value=InterfaceObject.MethodName (tracking number);'

As a result, when a user of the application hit a particular button to request the status of a package, a remote method call would be made to this Web Service to obtain status information on a particular package identified by tracking number. The tracking information returned by the remote service is then displayed to the user.

At runtime, the application environment dynamically generates, at step 504, the proxy (i.e., the THHTPRio object) that makes the call on the Web Service. This is in contrast to prior art systems in which the proxy for remote method invocation typically must be generated when the application is compiled. When the above call is made by the client application for the status of a particular package, the runtime environment will make the method call of the interface acquired in step 503, but the method call will be dispatched to the generic proxy for conversion to a particular wire protocol and then sent to a remote system via the configured network transport (in this case the wire protocol is SOAP and the transport is HTTP). After the above call on the remote service is made, the dynamically generated proxy dispatches the particular service call to the generic proxy implementation in the generic interface object. Next, at step 505 an InvokeContext data structure (TInvContext) is created. The InvokeContext is a generic data structure independent of calling convention and other such details. The InvokeContext provides the serializer (i.e., the component of the THTTPRio interface object that will turn the remote method call into a particular wire format) with a generic data structure containing the details required to understand all necessary parameters. In this manner, the serializer may consult a generic data structure to understand the parameters sent by the calling application, as well as those subsequently returned from the remote service.

At step 506, the serializer converts (or serializes) the appropriate parameters contained in the InvokeContext data structure into a stream of data bytes. The order of the parameter information sent and other specific details of this serialization process will vary depending on the particular wire format used in the implementation. In this example, SOAP section 5 encoding rules are used to create the stream of data bytes.

At step 507, the stream of data bytes that is created is taken and, using another interface available from the THTTPRio subclass that introduces a particular transport, a call is made to a simple method of that transport named Execute. The Execute method makes the remote procedure call by sending a packet (or stream of bytes) in a particular format to the remote service and returns the response.

On the client side, specific parameters and information about the method call in the InvokeContext data structure are first converted into a particular wire format (a stream of bytes or packet), and then this packet is sent to the remote server using a particular transport. As a result, two interfaces are involved. A first interface converts particular information in the InvokeContext data structure into a stream of bytes in a particular wire format. A second interface determines where this stream of bytes (or packet) should be sent. Typically, the packet will be sent to a remote service somewhere on the Internet. Use of these two interfaces enables the remote service to understand the packet as a remote procedure call, using the SOAP standard, for invocation of a particular method. In response, the remote service will process the remote procedure call (as described below in the "server side operations" section). The remote service will, typically, send a return packet back to the client in response.

At step 508, the transport interfaced component included in the THHTPRio interface object listens for a response from the remote service. As a particular protocol is used to make the remote call, the listener waits for a response using this same protocol. For example, if an HTTP packet is sent, the listener will wait for an HTTP packet in response. When a return value is received back from the remote service, at step 509 the serializer is used to deserialize the response data (i.e., the response SOAP packet) and place the return data values into the InvokeContext data structure. The return data values in the InvokeContext are thereby made available to the client application by the interface object. The interface object interprets the parameters in the InvokeContext structure and supplies the appropriate return values back to the client application.

2. Server Side Operations

The server side operations start with the notion that to make a service available to remote clients, an interface definition is required. On the server side, however, instead of calling a remote service, one wants to implement that service. In other words, a developer/user wants to provide a particular service, such as the above example of a Web Service providing the delivery status of a courier package. At step 601, the developer/user defines the interface that makes up his or her Web Service. If the interface includes any complex (non-scalar types), he or she ensures that their structure is properly described and can be marshaled correctly.

At step 602, the user/developer takes the interface definition of his or her Web Service and develops classes to implement the interfaces defined at step 601. The implementation of these interfaces includes registering the implemented classes. Registration of an implemented class makes the Web Service available to be called remotely. The process of registration includes telling clients how to submit requests on that particular Web Service. For example, clients are told that remote requests need to be directed to a particular URL.

At step 603, the implemented classes (i.e., the Web Service) are compiled, linked and installed under a particular server architecture, such as a Web server. The user/developer chooses the type of server application he or she wants to have to implement the Web Service. In the currently preferred implementation of the present invention, a listener/dispatcher module (THTTPSoapDispatcher) listens underneath a Web server for SOAP procedure requests on the Web Service. For example, if clients are told to send remote requests to a particular URL, the dispatcher listens for requests (remote procedure calls) to be made on that URL.

When a request is received, the dispatcher, at step 604, initiates the process of converting the request into a native call on the appropriate method on the server. For example, the request may be translated into a Pascal call to a particular class that was written using the Delphi visual development system. Alternatively, the request may be converted and dispatched to a C++ implementation. The dispatcher will use the packet and any other headers in the request (HTTP headers for example) to determine the registered class implementing the method that is being called remotely.

At step 605, the dispatcher deserializes the packet received from the client, utilizing a class that implements the same type of interface (IOPConvert) that is used on the client side to serialize the request. On the server, the dispatcher will delegate to an implementation of THTTPSOAPDispatch which will deserialize a SOAP request into an instance of the InvokeContext data structure using classes that deserialize SOAP encoded packets.

At step 606, the InvokeContext data structure is forwarded to the invoker (TPascalInvoker) to invoke an instance of the class that implements the service requested (e.g., the package tracking application). The invoker takes the InvokeContext as input and invokes a method on the instance of the class that is being called (e.g., the "GetCurrentStatus" method). The invoker synthesizes the appropriate data provided in the request, constructs a stack frame identical to that which would be made if a native call was being made, and makes a native call to the native method (e.g., a Pascal call into the package tracking service).

The invoker also, at step 607, places return values (output results) received from the native method into the InvokeContext data structure and forwards the InvokeContext back to the TSOAPPascalInvoker for serialization and return of the response values to the client. At step 608, the TSOAPPascalInvoker creates a response packet by serializing the result values in the InvokeContext data and returning a packet to the dispatcher for return to the client. Alternatively, the dispatcher or any of the classes it delegates the call to may advise of a problem or exception which is then passed back through the dispatching chain to notify the client of any problem or exception that may have occurred.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A computer-implemented method for a client to make a remote method call on a service, the method comprising:
    obtaining an interface definition of a particular service available to remote clients, said interface definition including runtime type information;
    casting a generic interface class to said particular service for dynamically generating a proxy at runtime based on said generic interface class and said interface definition of said particular service for making a remote method call on said particular service; and
    when a call is made by a client on said particular service, said proxy automatically making a remote method call on said particular service by performing the substeps of:
    converting said call made by said client into a converted call in a wire format specified in said interface definition;
    sending said converted call to said particular service using a method of transport specified in said interface definition;
    in response to receipt of said remote method call in said particular service, deserializing said remote method call into native format;
    invoking said particular service by making a native call on said particular service in native format; and
    reserializing results of said native call on said particular service and returning said reserialized results in response to said remote method call.

2. The method of claim 1, wherein said generic interface class is subclassed to provide support for particular wire formats.

3. The method of claim 1, wherein said generic interface class is subclassed to provide support for particular methods of transport.

4. The method of claim 1, wherein said generic interface class is used with a plurality of wire formats and method of transports.

5. The method of claim 1, wherein said step of casting a generic interface class includes casting a subclass of said generic interface class that supports a particular wire format and method of transport.

6. The method of claim 5, wherein said wire format is Simple Object Access Protocol (SOAP) and said method of transport is HyperText Transfer Protocol (HTTP).

7. The method of claim 1, wherein said substep of converting said call includes serializing said call into a particular wire format.

8. The method of claim 7, wherein said particular wire format includes Simple Object Access Protocol (SOAP).

9. The method of claim 1, wherein said substep of sending said converted call includes sending said converted call via the Internet.

10. The method of claim 1, wherein said substep of sending said converted call includes sending said converted call using HyperText Transfer Protocol (HTTP).

11. The method of claim 1, wherein said substep of sending said converted call includes sending said converted call in a manner specified in said interface definition.

12. The method of claim 1, wherein said substep of sending said converted call includes receiving return values in response to said converted call.

13. The method of claim 12, wherein receiving return values includes deserializing said return values.

14. The method of claim 1, further comprising:
    said proxy returning results of said remote method call to said client by performing the substeps of:
    receiving packets returned in response to said remote method call;
    converting said packets into results in native format and returning said results in native format to said client.

15. A computer-implemented method for making a service available to remote clients, the method comprising:
    creating an interface definition for a particular service, said interface definition including runtime type information;
    implementing said interface definition as part of said particular service;
    in response to a request received from a remote client on said particular service, using a dynamically generated proxy generated at runtime based on a generic interface class and said interface definition of said particular service for sending said request to said particular service in a format specified in said interface definition and automatically converting said request into a native call on said particular service; wherein the dynamically generated proxy converts said request into a particular wire format specified in said interface definition of said particular service and sends said request to said particular service using a method of transport specified in said interface definition of said particular service;
    in response to receipt of said request in said particular service, deserializing said request into native format;
    invoking said particular service by making a native call on said particular service in native format;
    converting return values resulting from said native call on said particular service into a format appropriate for return to said remote client and sending said return values to said remote client.

16. The method of claim 15, wherein said step of implementing said interface definition includes installing implemented classes on a Web server.

17. The method of claim 15, wherein said step of implementing said interface definition includes registering said interface to make said particular service available to remote clients.

18. The method of claim 15, wherein said step of implementing said interface definition includes implementation of a dispatcher that listens for requests made on said particular service.

19. The method of claim 18, wherein said dispatcher listens for requests made in accordance with said interface definition.

20. The method of claim 15, wherein said step of converting said request into a native call includes deserializing packets received by from said remote client.

21. The method of claim 20, wherein deserializing packets includes deserializing Simple Object Access Protocol (SOAP) packets.

22. The method of claim 15, wherein said step of converting said request into a native call includes determining a method of said particular service to be invoked.

23. The method of claim 15, wherein said step of converting return values includes serializing said return values into a particular wire format.

24. The method of claim 23, wherein said particular wire format is the same format in which the request is received from said remote client.

25. The method of claim 23, wherein said particular wire format includes Simple Object Access Protocol (SOAP).

26. The method of claim 15, wherein said step of sending return values includes sending said return values via the Internet.

27. The method of claim 15, wherein said step of sending return values includes using a particular method of transport.

28. The method of claim 27, wherein said method of transport is the same method of transport used by said remote client to make the request on said particular service.

29. The method of claim 27, wherein said method of transport includes HyperText Transfer Protocol.

30. A computer system for making a service available to remote clients, said system comprising:
   an interface definition for a particular service to be made available to remote clients, said interface definition including runtime type information;
   a dynamically generated proxy generated at runtime based on a generic interface class and said interface definition of said particular service for sending remote method invocations in a predetermined wire and transport format specified in said interface definition; wherein the dynamically generated proxy converts said remote method invocations into a wire format specified in said interface definition of said particular service and sends said remote method invocations in a transport format specified in said interface definition of said particular service;
   a dispatcher module for listening for remote method invocations on said particular service, receiving said remote method invocations in said predetermined wire and transport format, deserializing said remote method invocations into native format, reserializing returned result values from native format into said predetermined wire and transport format, and returning said reserialized return values; and
   an invoker module for making a native call on said particular service and returning result values from said native call.

31. The system of claim 30, wherein said invoker module returns results of said native call to said dispatcher module.

32. The system of claim 30, wherein said predetermined wire and transport format includes Simple Object Access Protocol (SOAP) wire format and HyperText Transfer Protocol (HTTP) transport format.

33. The system of claim 30, further comprising: a data structure for containing deserialized information from said remote method invocation and return values from said particular service.

34. The system of claim 33, wherein said dispatcher module deserializes remote method invocations into said data structure.

35. The system of claim 33, wherein said dispatcher module provides said data structure to said invoker module.

36. The system of claim 33, wherein said invoker module places return values from said native call into said data structure.

37. The system of claim 33, wherein said dispatcher module reserializes return values in said data structure and returns said reserialized return values in response to said remote method invocation.

38. The system of claim 30, wherein said dispatcher module is implemented as part of a Web server module.

39. The system of claim 30, wherein said dispatcher module listens for remote method invocations in particular wire formats.

40. The system of claim 30, wherein said dispatcher module listens for remote method invocations received via the Internet.

41. The system of claim 30, wherein said dispatcher module listens for HyperText Transfer Protocol (HTTP) posts containing Simple Object Access Protocol (SOAP) requests.

42. A computer-implemented method for making a service available to remote clients, said method comprising:
   developing an interface definition to a service to be made available to remote clients, said interface definition including runtime type information;
   implementing said interface definition to create an implemented interface to said service, said implemented interface listening for requests on said service;
   dynamically generating a proxy at runtime based on a generic interface class and said interface definition of said service for sending a remote method call to said service in a format specified in said interface definition; wherein said dynamically generated proxy converts said remote method call into a particular wire format specified in said interface definition of said service and sends said remote method call to said service using a method of transport specified in said interface definition of said service;
   in response to receipt of said remote method call in said service, deserializing said remote method call into native format;
   invoking said service by making a native call on said service in native format; and
   reserializing results of said native call on said service and returning said reserialized results in response to said remote method call.

43. The method of claim 42, wherein said step of implementing said interface definition includes registering said implemented interface to make said service available remotely.

44. The method of claim 42, wherein said interface definition includes an invokable interface; said invokable interface enabling remote clients to cast an instance of said interface for purposes of making a remote method call on said service.

45. The method of claim 42, wherein said implemented interface includes a dispatcher module for handling remote method calls on said service.

46. The method of claim 42, wherein said step of deserializing said remote method call includes using the same wire format used to serialize the request.

47. The method of claim 42, wherein said step of deserializing said remote method call includes deserializing a Simple Object Access Protocol request.

48. The method of claim 42, wherein said step of deserializing said remote method call includes deserializing said remote method call into a data structure.

49. The method of claim 48, wherein said step of invoking said service includes passing said data structure to said service.

50. The method of claim 42, wherein said step of returning said serialized results includes returning said serialized results using the same method of transport used to send said remote method call.

* * * * *